UNITED STATES PATENT OFFICE.

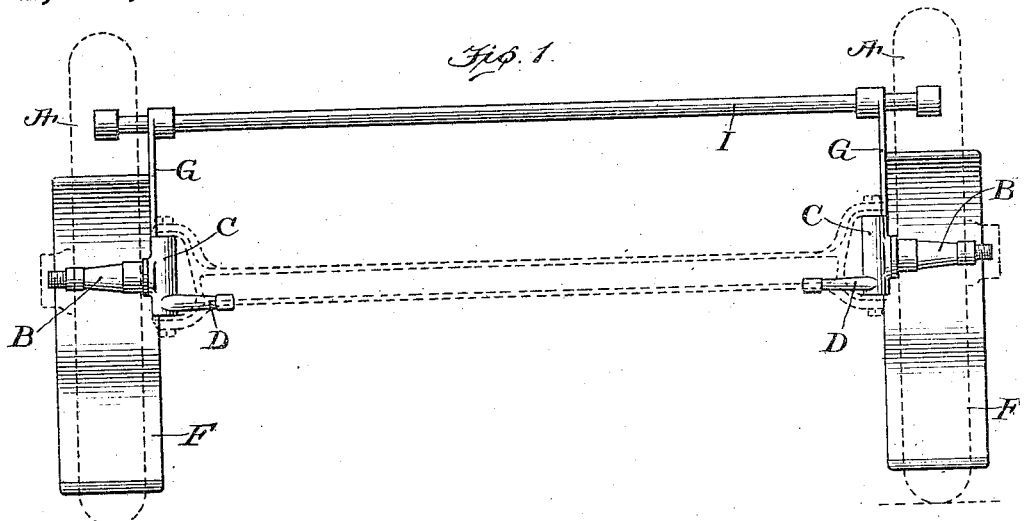
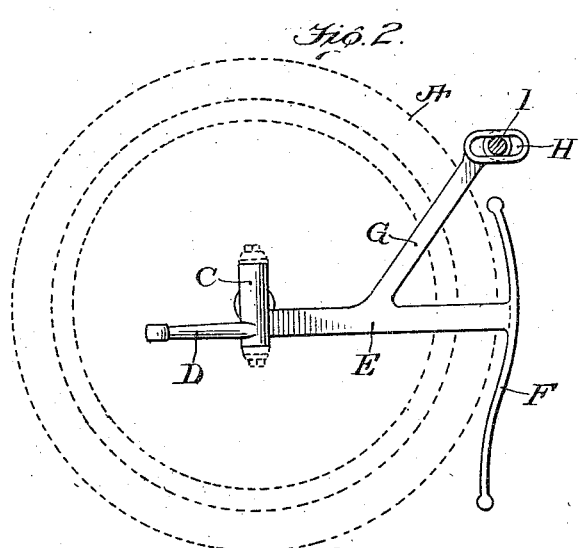
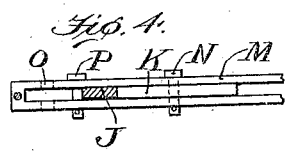
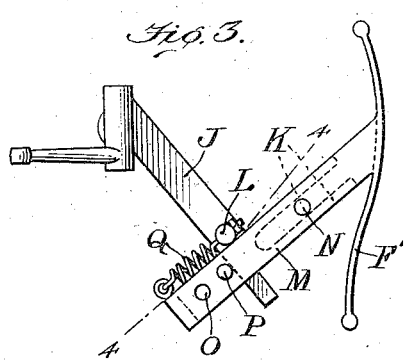
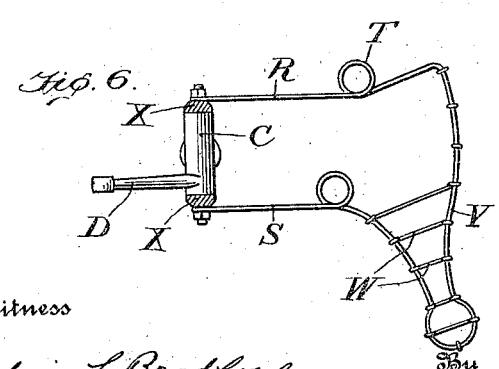
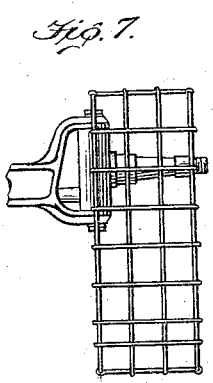
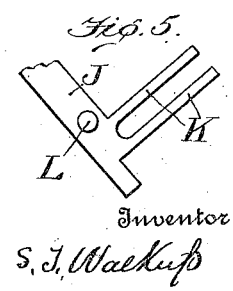

SAMUEL THOMAS WALKUP, OF NEW YORK, N. Y.

AUTOMOBILE-FENDER.

1,237,589.

Specification of Letters Patent.

Patented Aug. 21, 1917.

Application filed April 12, 1916. Serial No. 90,669.

*To all whom it may concern:*

Be it known that I, SAMUEL T. WALKUP, a citizen of the United States, residing at New York, in the county of New York and State of New York, have invented certain new and useful Improvements in Automobile-Fenders, of which the following is a specification, reference being had therein to the accompanying drawing.

This invention relates to fender devices for use on automobiles for the purpose of preventing injury to persons who may fall in front of the moving vehicle. The object is attained by providing each forward wheel with a fender which always preserves its normal position with respect to the wheel, however the latter may be turned to the right or left.

In the accompanying, largely diagrammatic, drawings,

Figure 1 is a rear elevation of the fender devices, the wheels being indicated in dotted lines.

Fig. 2 shows the devices for one wheel looking from the medial line between the wheels.

Fig. 3 is a view similar to Fig. 2 showing a different and preferred construction.

Figs. 4 and 5 are detail views of parts seen in Fig. 3.

Fig. 6 is analogous to Fig. 2 showing a second modified construction or form of the device especially adapted for light automobiles.

Fig. 7 is a view looking from the right in Fig. 6.

In Figs. 1 and 2, A represents a vehicle wheel mounted on a stub axle B carried by the usual vertical sleeve C which is provided with an arm D by means of which wheel and axle spindle are forced to swing laterally about the axis of the sleeve as desired. The rigid structure B, C is provided with a rigid forwardly extending arm E which bears at its forward end a light curved fender proper F extending from a point near the ground line to a point usually above the height of the axle and having a suitable width, usually about the same as the width of the wheel rim. Preferably a rigid or integral arm G extends upward from the arm E and has near its upper end a horizontal slot H in which lies loosely a bumper bar I of any suitable construction extending from side to side of the machine, above the plane of the fender F.

Obviously, however the wheel may swing the fender is always in front of it and prevents its riding up and over a person upon the ground. When the machine is likely to move at high speed it is desirable to have the fender yielding so that the violence of impact may be lessened. I therefore prefer in such case to use a construction differing from that shown in Figs. 1 and 2, substituting for the arm E a downwardly and forwardly inclined arm J, Figs. 3, 4, provided with a forked arm K and a lateral stud L. The fender F' has a rigid slotted arm M adapted to receive the arm J and provided with a pin N to slide in the slot in the forked arm K, and also provided with holes O to receive a stop pin P which is drawn against the arm J by a spring Q adjustably held in the stud L and connected to the lower end of the arm M. The arm J extends below the arm M so that when impact on the fender slides the arm M and tends to rotate it about the axis of the pin N the pin P will not swing below the lower end of the arm J.

Where the vehicle is light, I prefer to use a third construction, the arm E or J being replaced by wire arms R, S, Figs. 6, 7, which are coiled at T and which support, respectively, the upper and lower portions of a light wire netting fender V, the lower portion of which is doubled upon itself and has brace wires W extending from one fold to the other. The whole swinging structure is supported in the usual axle fork X.

What I claim is:

1. The combination with automobile wheels mounted upon swinging axle spindle members, respectively, of fenders guarding the forward sides of said wheels, respectively, and a yielding support connecting each fender to the corresponding spindle member and adapted to allow the fenders to move downwardly rearward on meeting material resistance in advancing.

2. The combination with an automobile wheel mounted upon an axle spindle, of a swinging support for said spindle, an arm projecting forwardly from said support, a fender covering the lower front portion of the wheel, and a device supporting said fender from said arm and adapted to cushion impact of the fender upon any object against which it advances and arranged to move rearwardly downward at the same time.

3. The combination with a horizontally swinging axle spindle member having a forwardly and downwardly inclined rigid arm, of a bar mounted upon the lower portion of said arm to slide upwardly and forwardly with respect thereto, stops limiting such sliding, a spring holding the bar at one limit of its path under normal conditions, and a wheel guarding fender secured to the upper end of said bar.

4. The combination with front automobile wheels mounted on corresponding axle spindles, of swinging supports for said spindles, respectively, rigid arms projecting upwardly from said supports respectively, a horizontal bumper bar free to slide horizontally in bearings in the upper ends of said arms, distinct fenders located in front of the wheels, respectively, arms projecting from said supports, respectively, below the bumper carrying arms, rearwardly and downwardly oblique bars slidingly supported by the arms last mentioned and themselves carrying said fenders, respectively, and springs resisting the sliding of said bars under the force of impact upon the fenders.

In testimony whereof I affix my signature in presence of two witnesses.

SAMUEL THOMAS WALKUP.

Witnesses:
FRANK A. ZEISLER,
T. H. RODMAN.

Copies of this patent may be obtained for five cents each, by addressing the "Commissioner of Patents, Washington, D. C."